United States Patent
Rust

[11] Patent Number: 6,059,299
[45] Date of Patent: May 9, 2000

[54] MACHINE FOR TRANSPORTING EQUIPMENT

[76] Inventor: Loval M. Rust, P.O. Box 820683, N. Richland Hill, Tex. 76182

[21] Appl. No.: 09/332,386

[22] Filed: Jun. 14, 1999

[51] Int. Cl.⁷ .................................................... B62B 3/02
[52] U.S. Cl. ................................. 280/47.131; 280/47.21; 280/47.24; 280/63; 414/446
[58] Field of Search .................................. 414/446, 444; 280/35, 47.12, 47.131, 47.23, 47.24, 47.21, 63, 47.17

[56]  References Cited

U.S. PATENT DOCUMENTS

| | | | |
|---|---|---|---|
| 3,389,818 | 6/1968 | Rinehart | 414/446 |
| 4,398,737 | 8/1983 | Harding | 280/47.131 |
| 4,852,895 | 8/1989 | Moffitt | 280/47.131 |
| 4,902,187 | 2/1990 | Rousseau | 414/490 X |
| 5,593,271 | 1/1997 | Hall | 414/446 X |

FOREIGN PATENT DOCUMENTS

| | | | |
|---|---|---|---|
| 1114586 | 4/1956 | France | 414/444 |
| 1257110 | 12/1961 | France | 414/444 |

*Primary Examiner*—Michael Mar

[57] ABSTRACT

A machine for transporting equipment with a curved body for receiving a troweling machine and mating with the machine along its curved edge, two wheels mounted to the body for movement of the body, and an attachment mounted on the body for selective attachment of the body to the troweling machine. A preferred embodiment includes an axle connecting the wheels and a body that is a curved portion of a circle for mating with a troweling machine. Another preferred embodiment has a body with an angled support for mating with the edge of the troweling machine and a pivotally mounted latch for attachment of the equipment to the body.

6 Claims, 3 Drawing Sheets

MACHINE FOR TRANSPORTING EQUIPMENT

BACKGROUND OF THE INVENTION

This invention relates generally to the field of transport, and more particularly to a machine for transporting equipment.

Moving heavy equipment around a job site has taken many forms. Typically, a crew of two or more individuals manually moves equipment from a truck to the site. Because such equipment is bulky and odd shaped, traditional dollies and carts are not feasible for easy transport of the equipment. In the case of a troweling machine, movement requires several individuals and is dangerous and difficult. Further, a troweling machine typically has no wheels mounted on it for movement thereby necessitating a separate moving device.

The prior art involved precarious movements of equipment by manual labor or with the use of a four wheel cart. Such carts are difficult to move across rough terrain and still require the labor of several individuals for loading on the cart and moving across the terrain. Further, none of the prior art carts permit easy access to the troweling machine or other equipment for cleaning or repair.

SUMMARY OF THE INVENTION

The primary advantage of the invention is to provide a dolly for transporting heavy equipment.

Another advantage of the invention is to provide a dolly that latches easily onto a troweling machine.

Another advantage of the invention is to provide a dolly that can be easilly operated by one individual.

A further advantage of the invention is to provide a durable dolly that easily rolls equipment to a job site.

Yet another advantage of the invention is to provide a lightweight dolly that is durable and capable of balancing heavy equipment.

Other advantages of the present invention will become apparent from the following descriptions, taken in connection with the accompanying drawings, wherein, by way of illustration and example, an embodiment of the present invention is disclosed.

In accordance with a preferred embodiment, there is shown a machine for transporting equipment comprising a body for receiving a piece of equipment, two wheels mounted to said body for movement of the body, and a latch mounted on said body for selective attachment to the equipment.

In accordance with another preferred embodiment, there is shown a machine for transporting equipment comprising a curved body for receiving a troweling machine and mating with said machine along its curved edge, two wheels mounted to said body for movement of the body, and an attachment means mounted on said body for selective attachment of said body to the troweling machine.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
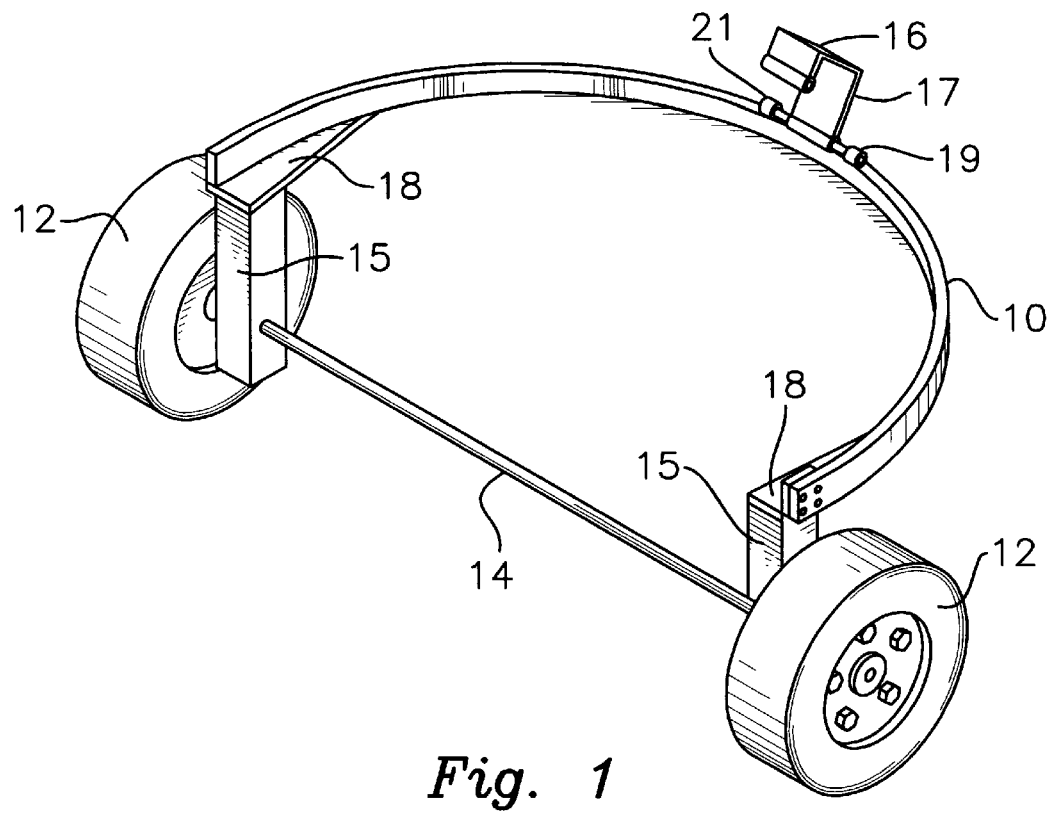
FIG. 1 is a perspective view of the invention.

Turning first to FIG. 1 there is shown a transport device according to a preferred embodiment of my invention. Body 10 is a curved piece of metal or other durable material having two angled steel supports 18 for supporting a troweling machine. In a preferred embodiment, there is shown a vertical support 15 having an axle 14 welded within the vertical support. Wheels 12 are attached to the axle for movement of the overall transport device. The body is preferably curved in the shape of a circle to match the shape of the troweling machine or other piece of equipment, but may also be shaped in many different ways so long as the body has sufficient contact with the equipment for stable support. Attached to the body are two wheels 12 that are connected to said body by a pair of mating supports 15. The wheels may also be attached directly to the body if preferred. The wheels 12 are of conventional type but preferably have some type of rubber covering or inflatable tire for easy movement across rough terrain such as a job site or construction site. The wheels may be constructed of a conventional five bolt hub with a ball bearing insert and the tires may be a 4 ply inflatable tire. The wheels and tires may also suitably be replaced by solid wheels or any other wheel for movement and support of relatively heavy equipment. The tires may be connected to each by an axle 14 for added strength and may be made of solid steel.

FIG. 1 also shows a latch 16 pivotally mounted to the body for secure attachment of the body to the troweling machine. The latch may be of a variety of materials to provide the engaging strength needed to hold the toweling machine to the body. In a preferred embodiment, the latch is made of steel having a three knuckle hinge 17 and be engaged to the body via a hinge 19 and cotter pin 21.

Figure 2:
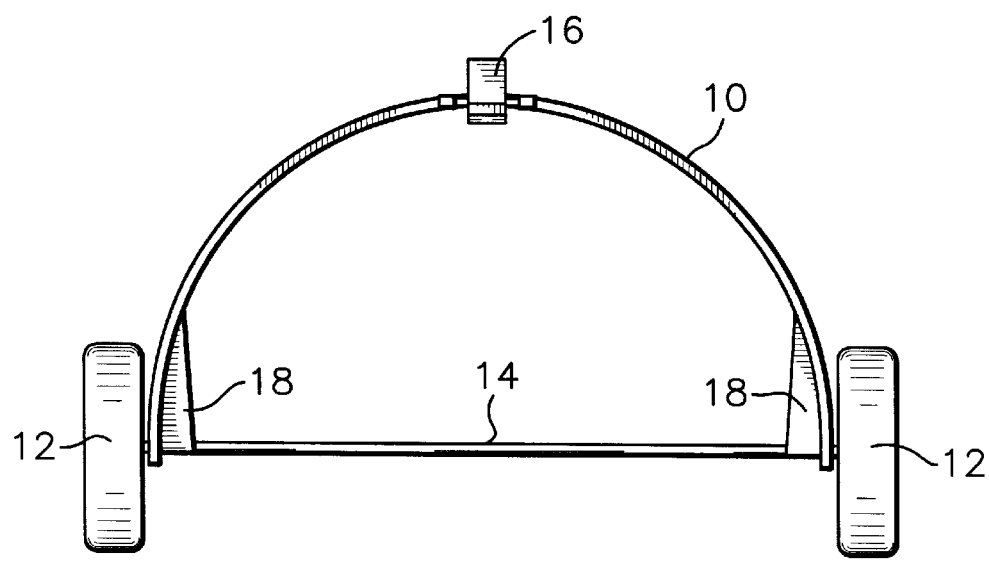
FIG. 2 is a plan view of the invention showing the support surface for the placement of the equipment.
Figure 2A:
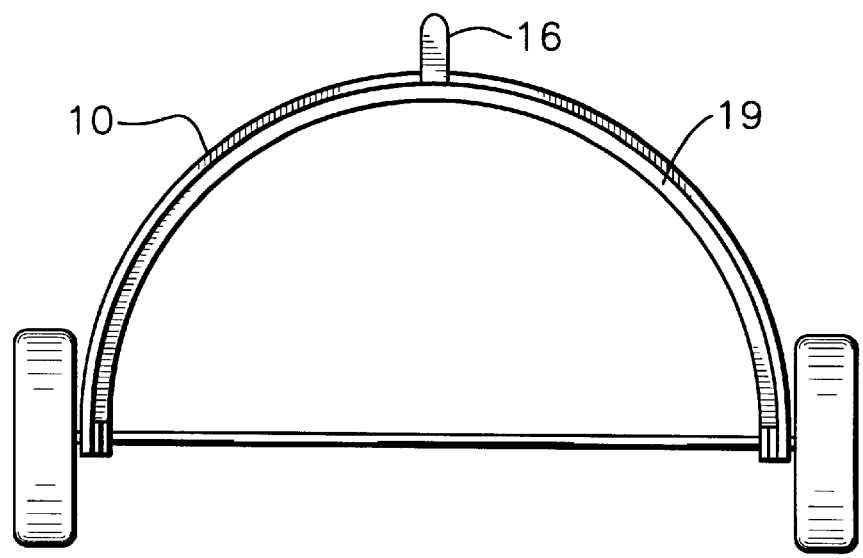
FIG. 2A is a plan view of an alternative embodiment of the invention showing the lip mating surface for the placement of the equipment.

FIG. 2 shows an overhead plan view of the transport machine having a two angle supports 18. As an alternative to the angle steel supports 18, there may also be an inside lip 19 for support of the troweling machine as shown in FIG. 2A. The lip may extend the entire length of the body or may also be staggered or located on the ends and in the middle with gaps between the lip. The lip need only be of sufficient extent to support the equipment after engagement with the body and attachment by the latch 16. The latch 16 may be of a variety of types, including metal, plastic, hook and loop fastener or Velcro® or other suitable attachment devices. The latch may be pivotally mounted or capable of pivoting motion to facilitate the easy attachment of the equipment to the body. The open construction of the body 10 permits easy access to the equipment for servicing, maintenance and the changing of blades in the case of a troweling machine.

Figure 3A:
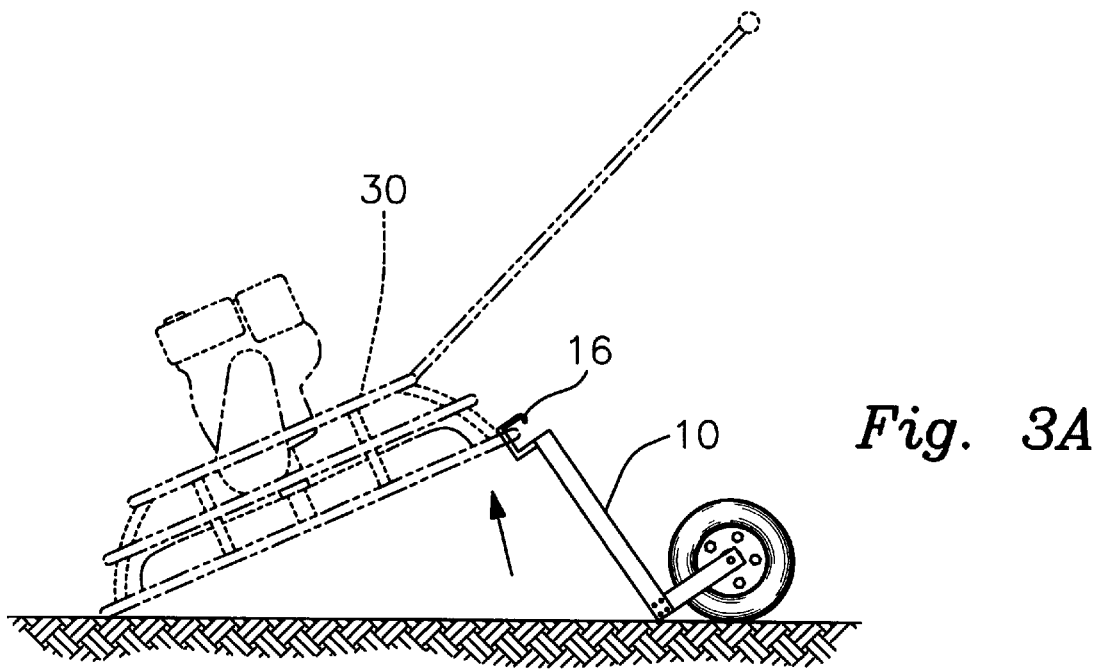
FIGS. 3A, 3B, and 3C show the process for connecting a troweling machine to the invention for easy loading and transport.
Figure 3B:
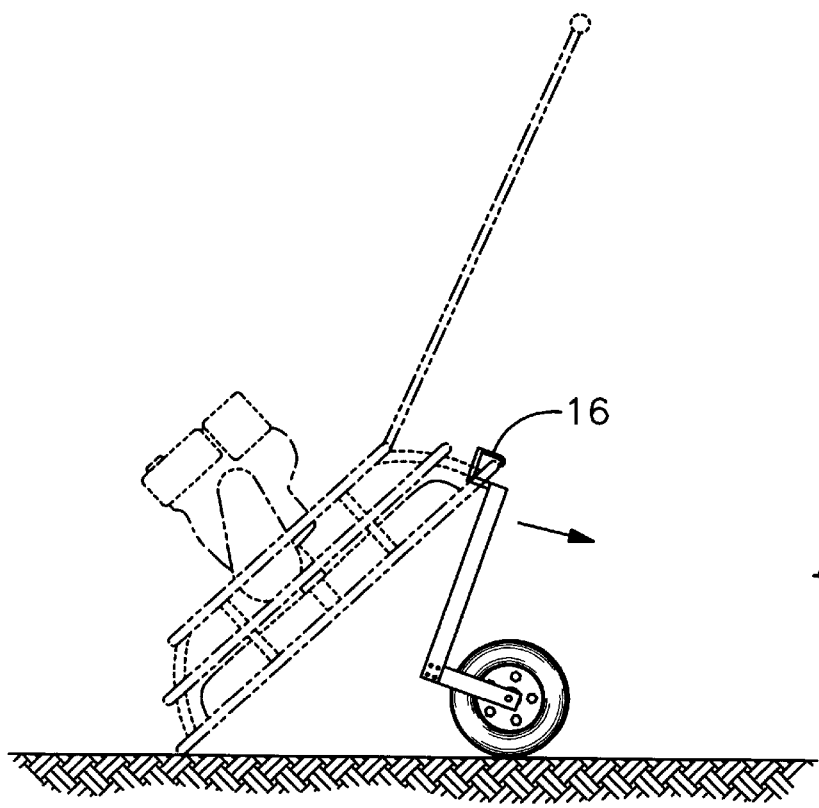
Figure 3C:
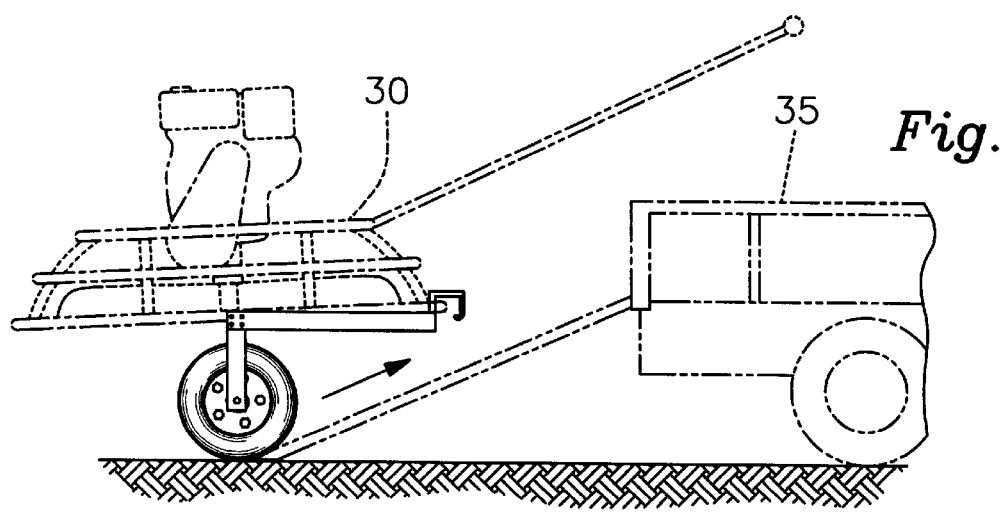

Turning now to FIGS. 3A, 3B and 3C, the attachment process for connecting the machine to the invention is shown. In operation, the troweling machine 30 is engaged to the body 10 while the body is rotated in an upside down position as shown in FIG. 3A. Once the machine is engaged via the latch 16 as depicted in FIGS. 3A and 3B, the troweling machine is lifted upward by its handle rotating the body backward toward the operator and permitting easy placement of the troweling machine onto the body for movement to a job site. FIG. 3C shows the machine fully engaged on the body for easy transport. FIG. 3C depicts the ease of movement onto a conventional trailer 35. This ability to use the handle of the piece of equipment as the transporting handle is an important feature of the invention. The transport dolly works in conjunction with the equipment to facilitate the easy attachment and subsequent movement of the equipment along with the dolly. This ability to use the device as the leverage for placement of it on the dolly greatly reduces the strain to the operator, makes it capable of being done by one person, and reduces the risk of accident from transporting heavy equipment by hand.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A dolly for transporting a troweling machine having a frame formed by a circular base ring, the dolly comprising:
   a semi-circular frame member having two free end portions;
   a pair of support plates attached to a lower edge of the semi-circular frame member proximate the pair of free end portions, the pair of supports plates extending inwardly relative to an outer surface of the semi-circular frame member, the semi-circular frame member and the pair of support plates adapted to assume a substantially horizontal orientation when the dolly is in a transport position;
   a pair of support members, each support member having a first end rigidly connected to a bottom surface of a respective one of the pair of support plates and extending downwardly in a perpendicular manner relative to the semi-circular frame member when the dolly is in the transport position;
   a pair of wheels rotatably attached to respective second ends of the pair of support members for rotation about a common rotational axis; and
   a pivotal latch connected to a central portion of the semi-circular frame member and extending upwardly therefrom when the dolly is in the transport position, wherein the pivotal latch is adapted to be attached to the circular base ring of the troweling machine and the semi-circular frame member is pivoted below the base ring to the transport position with the base ring being supported on the pair of support plates and the rotational axis of the pair of wheels being positioned substantially under a center of the base ring.

2. A dolly as claimed in claim 1, further comprising an axle extending through the second ends of the pair of support members, the axle having outer ends connected to the pair of wheels.

3. A dolly as claimed in claim 2, wherein the axle is made of steel tubing.

4. A dolly for transporting a troweling machine having a frame formed by a circular base ring, the dolly comprising:
   a semi-circular frame member having two free end portions;
   an inner support lip extending along a lower edge of the semi-circular frame member, the semi-circular frame member and the inner support lip adapted to assume a substantially horizontal orientation when the dolly is in a transport position;
   a pair of support members, each support member having a first end rigidly connected to a bottom surface of the inner support lip proximate a respective free end portion of the semicircular frame member and extending downwardly in a perpendicular manner relative to the semicircular frame member when the dolly is in the transport position;
   a pair of wheels rotatably attached to respective second ends of the pair of support members for rotation about a common rotational axis; and
   a pivotal latch connected to a central portion of the semi-circular frame member and extending upwardly therefrom when the dolly is in the transport position, wherein the pivotal latch is adapted to be attached to the circular base ring of the troweling machine and the semi-circular frame member is pivoted below the base ring to the transport position with the base ring being supported on the inner support lip and the rotational axis of the pair of wheels being positioned substantially under a center of the base ring.

5. A dolly as claimed in claim 4, further comprising an axle extending through the second ends of the pair of support members, the axle having outer ends connected to the pair of wheels.

6. A dolly as claimed in claim 5, wherein the axle is made of steel tubing.

* * * * *